United States Patent [19]

Safranek

[11] Patent Number: 4,873,962

[45] Date of Patent: Oct. 17, 1989

[54] HIGH EFFICIENCY ELECTRICAL ALTERNATOR SYSTEM

[75] Inventor: Edward J. Safranek, Arlington Heights, Ill.

[73] Assignee: F & B Mfg. Co., Gurnee, Ill.

[21] Appl. No.: 191,875

[22] Filed: May 9, 1988

[51] Int. Cl.$^4$ .................................................. F02P 1/00
[52] U.S. Cl. .................................. 123/599; 123/149 R
[58] Field of Search ............... 123/599, 149 R, 149 D, 123/149 C, 149 G, 148 CC, 179 D; 310/70 A, 70 R

[56] References Cited

U.S. PATENT DOCUMENTS

| | | | |
|---|---|---|---|
| 2,154,591 | 4/1939 | Waseige | 123/179 E |
| 3,955,550 | 5/1976 | Carlsson | 123/599 |
| 3,991,734 | 11/1976 | Martin | 123/179 E |
| 4,160,435 | 7/1979 | Sleder | 123/599 |
| 4,259,938 | 4/1981 | Johansson | 123/599 |
| 4,412,522 | 11/1983 | Fujimoto | 123/599 |
| 4,418,677 | 12/1983 | Hofmann | 123/599 |
| 4,528,970 | 7/1985 | Fujimoto | 123/599 |
| 4,558,668 | 12/1985 | Yabunaka | 123/179 D |

Primary Examiner—Raymond A. Nelli

Attorney, Agent, or Firm—Hill, Van Santen, Steadman & Simpson

[57] ABSTRACT

A high efficiency marine alternator system employs a marine engine flywheel as a rotor in an alternator. The rotor has a cup-shaped portion defined by an outer circular wall, and wherein a stator is received within the cup-shaped portion. The rotor is formed of a one-piece net ductile iron casting by the lost foam process. Magnets are mounted on an inner surface of the circular wall such that as the rotor rotates, the magnets move past pole faces of the stator. A starter motor ring gear is mounted on an outer surface of the circular outer wall. By minimizing a thickness of the outer circular wall on which the magnets are directly mounted and by direct mounting of the magnets on an inner surface of the outer wall, for a given diameter of the rotor/flywheel, the rotor magnets can be mounted at a maximum radius from a central rotational axis of the rotor, thus increasing linear velocity of the magnets as they move past the rotor faces, and improving efficiency of the alternator. Additionally, in conjunction with the high efficiency alternator, a Hall effect device timing system is provided together with a high efficiency charging system.

5 Claims, 10 Drawing Sheets

HIGH EFFICIENCY ELECTRICAL ALTERNATOR SYSTEM

RELATED APPLICATIONS

Co-pending applications of the same inventor also relating to alternators and ignition and charging systems associated therewith are: "Hall Effect Device Ignition and Charging System, Hill Case No. P-87,2483; "High Efficiency Charging and Regulating System", Hill Case No. P-88,0516; and "Improved Stator Assembly and Method for Manufacture Thereof", Hill Case No. P-88,0892.

BACKGROUND OF THE INVENTION

1. Field of the Invention

The present invention relates to electrical alternator systems employing a flywheel on gasoline engines. More particularly, the present invention relates to a marine engine alternator system constructed in conjunction with a flywheel of a marine engine.

2. Description of the Prior Art

It is known in providing electrical alternators in conjunction with gasoline engines, and particularly outboard marine engines, to employ a flywheel which is typically aluminum die cast, as a rotor of the alternator. Magnets are provided at an inside wall of the flywheel. A stator is mounted within a cup-shaped portion of the flywheel such that end faces of pole legs having coils thereon are located adjacent the magnets on the flywheel. As the flywheel rotates, the magnets move past the stator pole end faces so as to generate electric currents in the associated alternator coils.

Figure 1:
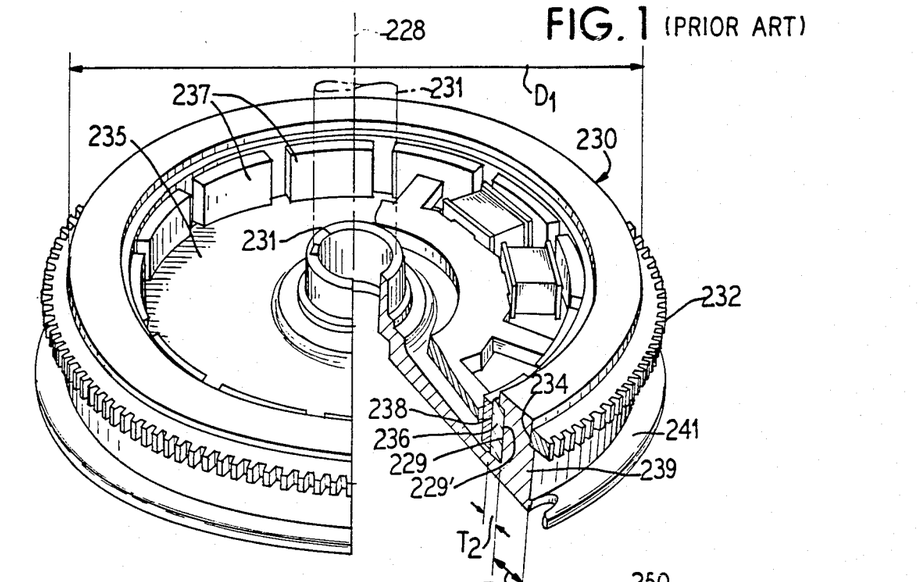
FIG. 1 is a perspective view of a prior art flywheel with magnets mounted thereon serving as a rotor for operation in conjunction with an associated stator, such as in an alternator of a marine engine.

One such prior art outboard marine engine flywheel arrangement is shown in FIG. 1. The aluminum die cast flywheel 230 is cup-shaped with a central hub insert 231 which is a separate piece insert molded in a central aperture of the flywheel. Insert 231 receives a drive shaft 231' of the marine engine. Such a flywheel is typically mounted near a top end of the engine within the engine outer casing. Ring gear 232 is mounted on a shoulder 233 around a periphery of the flywheel and abutting against an inset outer surface 234. A starter motor gear (not shown) engages with teeth of the ring gear 232 to turn the motor shaft 231' via the flywheel 230 and thus start the engine.

Within the inner cup-shaped portion 235 of the flywheel, an annular steel ring 236 is received within a pocket 229 having an inner wall 229'. The steel ring is insert molded there to increase the inertia of the flywheel since steel is approximately three times the weight of aluminum, of which the remainder of the flywheel is constructed.

Against an inner wall 238 of the annular ring 236, a plurality of magnets 237 are mounted in a circular pattern. For example, twelve such magnets may be provided, each of which is either a north or a south magnet, and each of which may complete an arc of approximately 28°. Typically such ceramic magnets have a $B_R$ of approximately 3800 gauss (ceramic magnets). Alternatively, elastomer bonded ferrite composite materials may be provided in strip form around the inner wall 238. The elastomer bonded magnet design typically has a $B_R$ of 1750 gauss. The elastomer magnet is thinner, however, and has a thickness of approximately 0.185 inches compared to 0.356 inches for the ceramic magnets.

The thickness of the peripheral wall 239 adjacent the steel ring 236, and shown at T1, is, for example, 0.6 inches given an outer diameter of D1=8.955 at the recess wall 234 where the ring gear mounts. The steel ring 236 typically can have a wall thickness T2 of 0.350 inches. The inner surface 238 at which the magnets 237 are mounted thus defines the greatest radius at which the magnets can be located. Since the starter motor configuration is given for a given marine engine design, and since typically the ring gear has a given thickness, the thickness T1 of the flywheel wall and the thickness T2 of the steel ring thus determine the maximum radial positioning of each of the magnets from a center axis 228. The total thickness of the wall an steel ring expressed as a percentage of the radius is:

$$\left[ \frac{(.350 + .6)}{(8.955 \times .5)} \right] \times 100 = 21.2\%.$$

Additionally, the peripheral wall 239 of the die cast flywheel has a thickness T1 sufficient to retain the steel ring during a so-called "burst testing" wherein the flywheel is rotated at higher and higher RPMs until the flywheel will burst or disintegrate.

Accordingly, in the prior art for a given engine casing dimensioning and starter motor positioning, the magnets 237 have a maximum radial displacement from the center axis 228 defined by the thick wall T1 and thick steel ring having dimension T2. With such a prior art design, the magnets move past the pole faces 240 (shown schematically) at a given velocity for a certain engine cranking RPM.

It is also known in non marine engine applications to provide a stamped steel flywheel as opposed to an aluminum die cast flywheel. However, such stamped steel flywheels are expensive to produce and have multiple pieces due to their stamped construction. Furthermore, such prior art units have relatively thick outer walls such that for given engine dimensions, the ring magnets are still positioned a substantial distance inwardly from the ring gear.

With such prior art flywheels, in order to generate sufficient voltage in coils associated with the alternator such as trigger coils, a substantial RPM is required for starting due to the limited velocity of movement of the magnets past the stator coils due to the limited radial displacement thereof. A pull cord (not shown) has an end attached such as in a slot 240 on an outer flange 241. As is well known, as the rope is pulled, the flywheel is rotated for manual starting of the engine. Also, the starter motor must have a given rating in order to rotate the flywheel at a sufficiently high speed for starting.

It is also known in small engine ignition systems to provide trigger coils which sense passage of the magnets on the flywheel to generate a trigger signal. The trigger signals may be employed to produce ignition pulses, such as by a capacitive discharge ignition circuit controlled by the trigger signals. Exemplary of such systems are U.S. Pat. Nos. 3,741,185 and 3,961,618.

With such prior art systems, the trigger pulses from the pickup or trigger coils are dependent on RPM. At low RPM, slow flux changes result in weak output pulses from the trigger or pickup coils.

It is also known in prior art systems to provide a shunt regulation system connection to alternator coils on the stator of the alternator to regulate a rectified output voltage for battery charging and electrical system operation. Substantial power is lost through heat dissipation with such shunt systems. Alternatively, it is known to also employ a full wave regulating system to regulate voltage to the battery and electrical system of the vehicle. However, at low RPM series connected control devices do not turn on and the battery is not charged.

SUMMARY OF THE INVENTION

It is an object of the present invention to provide an alternator and particularly a marine engine alternator which is of a higher efficiency than previous designs.

It is a further object of the invention to provide a flywheel used as a rotor in an alternator wherein the magnets move at a relatively higher velocity past stator poles for a given RPM and overall dimensions of the flywheel compared to prior art systems, so that greater electrical energy is generated for a given flywheel RPM.

It is a further object of the invention to provide a high efficiency alternator, charging, and ignition system in which for a given engine RPM, more electrical energy is provided at higher efficiencies, and at a relatively low RPM, improved engine battery charging results and improved voltages are provided with improved timing to aid in starting the engine at low RPMs.

According to the invention, the flywheel is constructed as a ductile iron casting having a relatively thin outer wall. No steel ring is employed since the iron casting provides sufficient inertia along with increased strength. Magnets to be moved past pole face ends of the stator, are mounted on an inner surface of the thin peripheral wall. Thus, for a given engine design having a given starter motor location and ring gear outer diameter, the magnets on the flywheel/rotor have a greater radial displacement from a center of the flywheel. Accordingly, the magnets move past stator pole end faces at a greater velocity for a given RPM. Thus, an alternator is provided having a higher electrical output for a given RPM and given dimensional constraints.

In combination with the above-described high efficiency alternator arrangement, Hall effect transducers are provided to initiate ignition triggering or timing pulses in lieu of prior art triggering coils. A flux concentration system is employed in conjunction with the Hall effect transducer to provide well defined triggering pulses at low RPM and wherein such triggering pulses are totally independent of RPM with respect to amplitude and waveshape. Thus, at low RPM not only does the alternator provide higher output voltages, but also the overall system provides improved ignition and timing at low RPMs. Furthermore, a high efficiency regulating system is provided which, in combination with the above features, provides improved battery charging at low RPM, while power loss is reduced at higher RPMs. Thus, a complete electrical alternator, ignition, and charging system is provided having higher efficiency.

DESCRIPTION OF THE PREFERRED EMBODIMENTS

Figure 2:
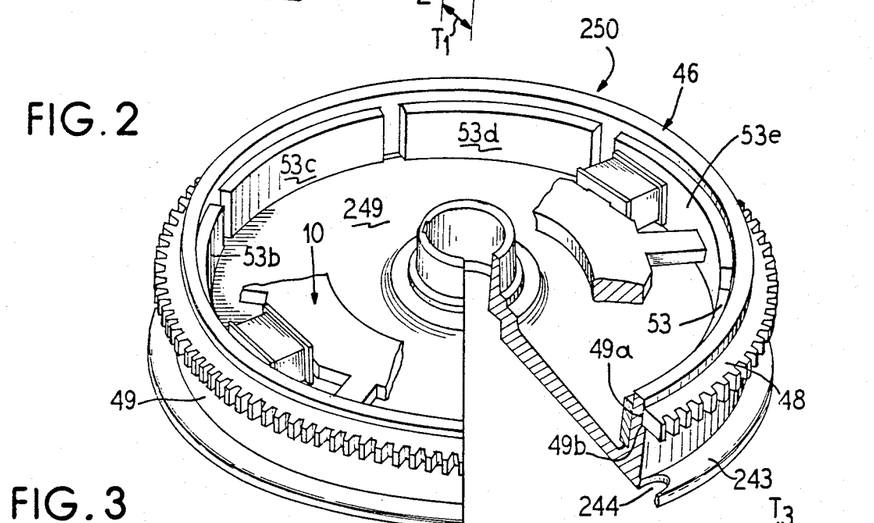
FIG. 2 is a perspective view of a flywheel/alternator arrangement according to the invention.
Figure 3:
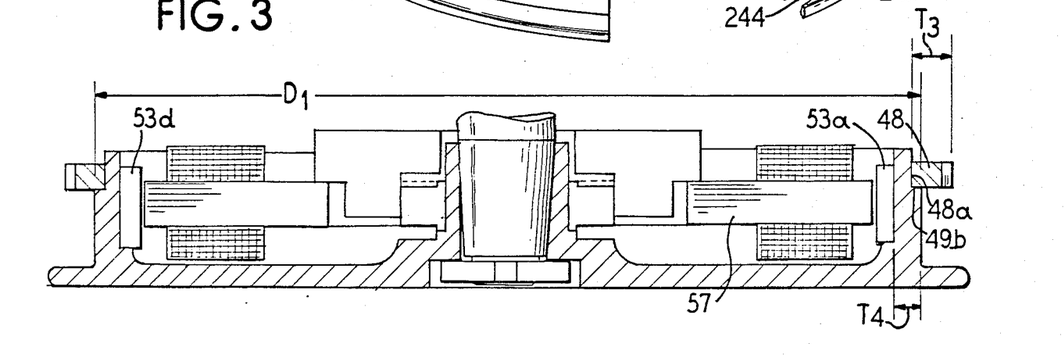
FIG. 3 is a cross-sectional view of the flywheel/alternator of the invention taken alone line III—III of FIG. 4.
Figure 4:
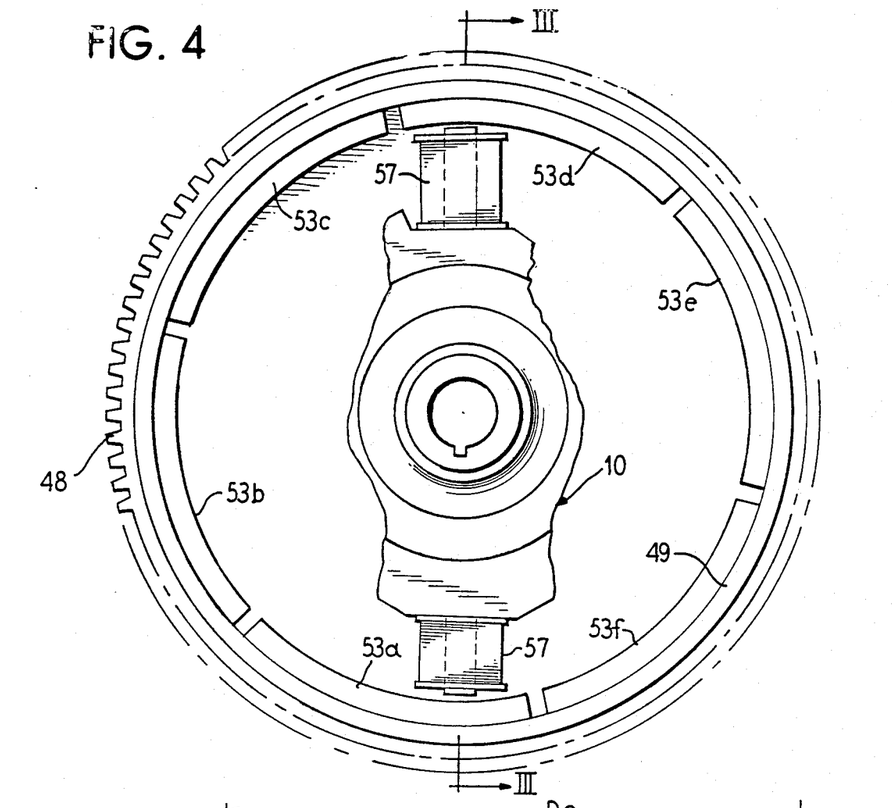
FIG. 4 is a plan view of the flywheel/alternator system shown in FIG. 2.

The high efficiency alternator 250 of the invention is shown in FIGS. 2, 3, and 4. A flywheel 46 is provided having a relatively thin outer circular wall 49 which permits placement of magnets 53a, b, c, d, e, f at a greater radius from the central axis 242 for a given outside diameter D1 of the flywheel (FIG. 3). It is assumed here that the diameter D1 of the flywheel is the same as the above described prior art flywheel shown in FIG. 1. As previously explained, this outer diameter D1 is generally limited by other constraints such as the inner diameter of the ring gear 48 as shown at 48a, thickness T3 of the ring gear, and placement of the starter motor (not shown) in relation to the ring gear. Also, the motor casing limits the overall dimensions of the flywheel, ring gear, and associated starter motor.

As shown in FIGS. 2, 3, and 4, like the prior art shown in FIG. 1, the ring gear 48 is mounted at shoulder 49b in abutment with recessed portion 49a of the outer circular wall 49. Also, a flange 243 having at least one rope pull slot 244 is provided, similar to the prior art.

With the invention, however, the thickness T4 of the outer wall 49 is substantially reduced, and is less than or equal to 0.3 inches and preferably approximately 0.25 inches. The width of shoulder 49b is approximately 0.06 inches, and the portion of the wall 49 at the recess 49a has a thickness of approximately 0.19 inches.

The flywheel 46 is constructed of a "net" ductile iron casting cast by the "lost foam process". A "net" ductile iron casting is a casting in which the final shape is as close as practical to the desired shape so that the least amount of machining is necessary. Such a casting process has been previously known and involves a process wherein the inside of a mold is filled with a material such as styrofoam which burns away during the casting process.

Ductile iron employed herein has a weight which is approximately three times the weight of the prior art aluminum casting shown in FIG. 1. Thus, the weight can be brought out to the maximum outside diameter to provide maximum inertia with minimum flywheel weight. The wall thickness T4 of the outer wall 49 also has been significantly decreased such that the inside diameter in the cup-shaped portion 249 increases significantly. Furthermore, the steel ring employed for inertia in FIG. 1 is not necessary. Also, the outer circular wall 49 can be thinner and still survive burst testing, since the overall strength of iron is substantially greater than aluminum and no heavy steel ring or other heavy inertia components need to be retained.

Increased reliability is attained because of the increased material strength of the ductile iron over the die cast aluminum. The burst test speed is much greater than the prior art aluminum casting shown in FIG. 1.

With the inventive flywheel shown in FIG. 2, an increased linear speed of the magnets 53a-f passing by the end faces of the stator poles 57 is increased for a given RPM of the flywheel. Also, a larger stator 10 is permitted with increased area for copper windings.

Relatively high strength magnets can be employed such as shown at 53a, b, c, d, e, and f, in view of the radius increase available. Ceramic magnets having a high residual induction $B_R$ of 3800 gauss can be employed. Such magnets have a thickness of T5=0.35 inches. Furthermore, the ceramic magnets are chosen to have a high intrinsic coercive force $H_{Ci}$ of approximately 3800 Oersteds. Thus, demagnetization is not a problem.

The stator 10 is preferably constructed of a material for minimum loss. The system disclosed is comprised of six north south magnet pairs. With such a system, at 5000 engine RPM, the frequency of the current induced in associated alternator coils is 500 hertz. Epstein curves known in the prior art give lamination loss in watts/pound. However, these curves are misused since basically all Epstein curves are at 60 hertz. The inventor ran experimental Epstein curves at higher frequencies and it became apparent that a plain low carbon steel such as previously employed in marine engine alternator stators was not generally acceptable. In the present invention, a silicon steel is employed which has high efficiency and lower loss (watts/pound) at the high frequencies seen in the present alternator system.

As can be seen in FIG. 3, the overall outer diameter D1 remains unchanged given a ring gear 48 having the same thickness T4 as the prior art shown in FIG. 1. However, since the outer circular wall 49 has a thickness 23 which is substantially less, for a diameter D1 of 8.955 inches, the radial spacing from the center axis 142 is increased by [T1+T2]−T4=0.6 inches+0.35 inches]−0.25 inches=0.70 inches. For an outer diameter 8.955 inches, this represents a percentage increase of 100

$$\left[\frac{.7}{(8.955 \times .5)}\right] = 15.64\%.$$

Since the percentage increase in velocity is proportionate to the percentage increase in circumference, linear velocity of the magnets moving past the pole faces increases by $15.64 \times 2\pi = 98.3\%$. This results in a substantial increase in operating efficiency at low RPMs.

With the invention, the wall thickness as a percentage of the radius is $$\left[\frac{.25}{(8.955 \times .5)}\right] \times 100 = 5.58\%$$

in this preferred embodiment. For a maximum wall thickness of 0.3", the percentage becomes $$\left[\frac{.3}{(8.955 \times .5)}\right] \times 100 = 6.7\%$$

(about 7%). This is much less than the 21.2% for the wall thickness as a percentage of the radius in the prior art flywheel.

Figure 5:
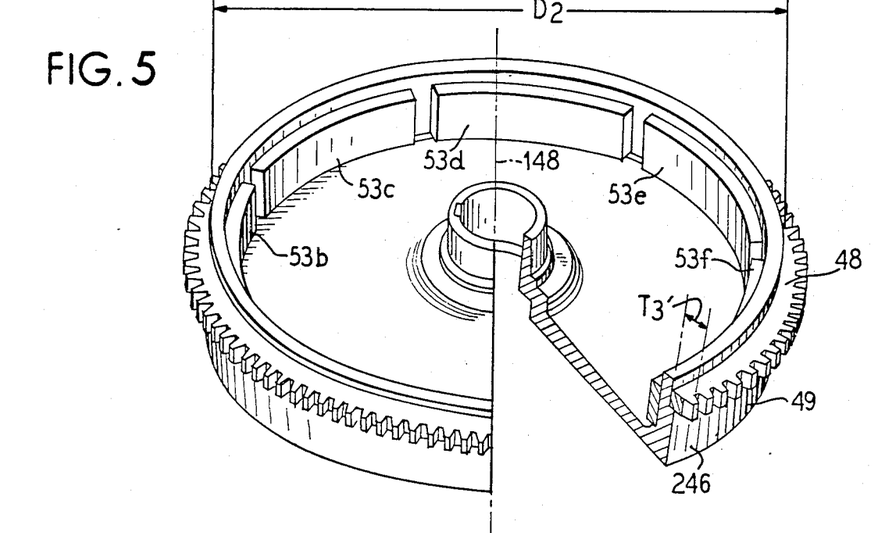
FIG. 5 is an alternate embodiment of the flywheel/alternator system shown in FIG. 2.

An alternate embodiment of the invention is shown in FIG. 5 wherein the flange 243 for rope starting via the slots 244 has been eliminated at the lower edge 246 of the outer wall 49. Since with the present system, the electrical system will provide sufficient ignition at very low RPM (a prototype tested at 10 Kv at 61 RPM), the rope pull slots may not be needed, and the flywheel may virtually be turned or started by hand or other simple mechanical system. Thus, if the ring gear 48 has a thickness T3' decreased to approximately 0.250 inches compared to an original thickness in FIG. 2 of 73=0.45, the outer diameter D2 can be increased by an amount equal to 2(0.45−0.25)=0.40 inches. Thus, an even greater increase in operating efficiency can be attained through a greater radial spacing between the central axis 248 and the magnets 53a-f on the inner surface of the wall 49.

With the invention, optimum efficiency was attained by providing each of the six magnets 53a-f as ceramic magnets having an arc of approximately 58°±20 and with a small gap between adjacent magnets.

With the inventive flywheel/alternator system of the invention, maximum efficiencies are obtained and a modular system is created in which as many charge coils as required and as many alternator coils as required can be provided for variable charging output curves. The system can thus be used on single, dual, or multiple cylinder marine engines.

In combination with the high efficiency alternator above described, a high efficiency ignition and charging system is employed such that an overall electrical system results of high efficiency. Such an ignition and charging system will now be described.

Figure 6:
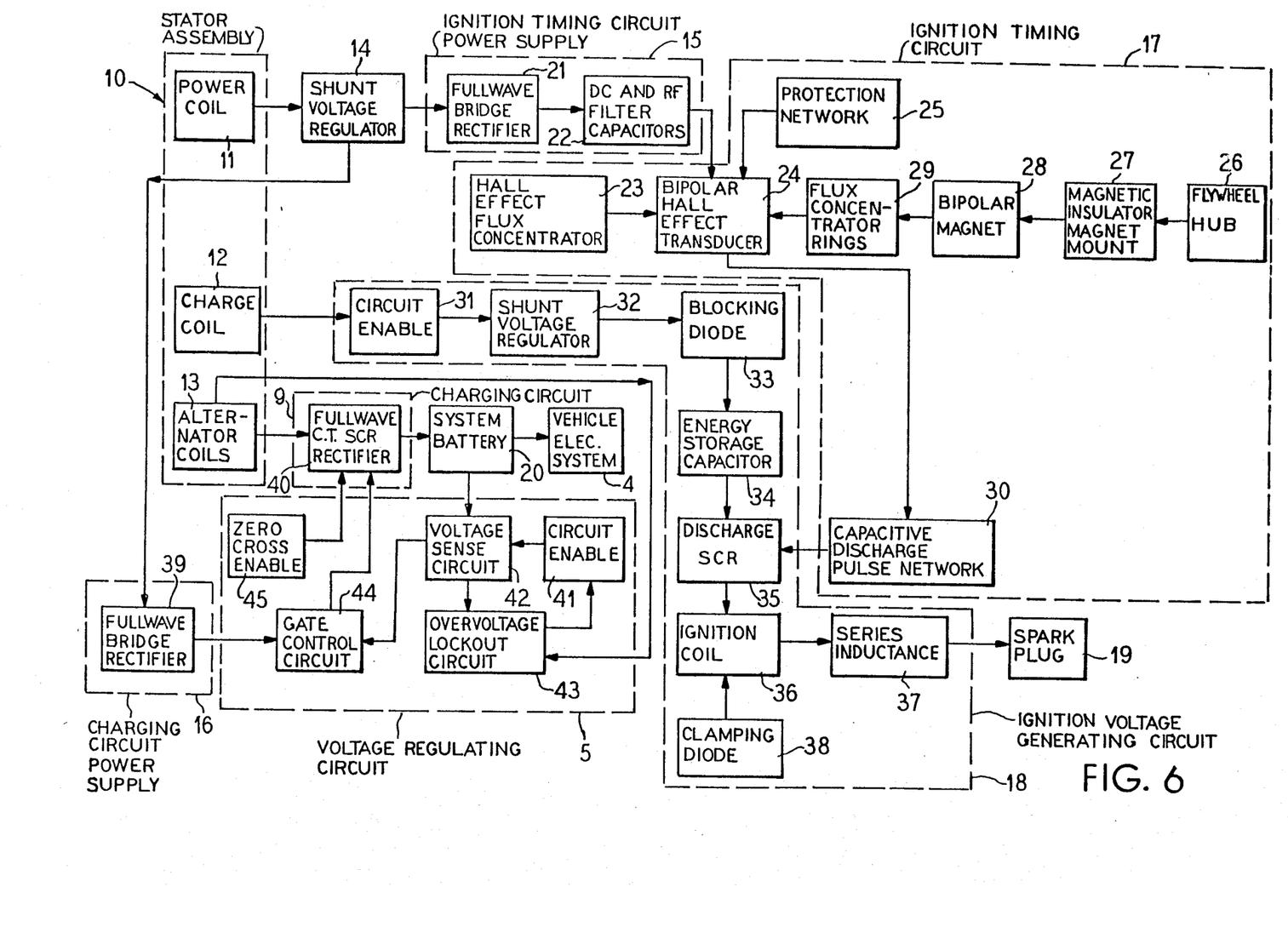
FIG. 6 is a block diagram of a Hall effect device ignition and charging system employed with the alternator system of the invention shown in FIGS. 2-5.

The block diagram of FIG. 6 generally shows an overall Hall effect device ignition and charging system employed with the above described flywheel alternator systems shown in FIGS. 2-5. The schematically illustrated stator assembly 10 has a power coil 11, charge coil 12, and alternator coils 13. The actual mechanical structure of the stator assembly 10 is shown in greater detail in the cross-sectional view of FIG. 7 and the top view of FIG. 8. The remainder of the circuit blocks shown in FIG. 6 are illustrated in greater detail in the detailed schematic diagram shown in FIGS. 9A, 9B, and 10, to be discussed hereafter.

The main circuit blocks of the Hall effect device ignition and charging system of the invention shown in FIG. 6 are as follows. Voltage from the power coil 11 is supplied via an ignition timing circuit power supply 15 to power the ignition timing circuit 17. Voltage from the power coil 11 is also fed via a charging circuit power supply 16 to the voltage regulating circuit 5.

The charge coil 12 of the stator assembly 10 provides voltage to the ignition voltage generating circuit 18 which in turn generates a high voltage for generating spark at the spark plug 19.

The alternator coils 13 provide supply voltage via a charging circuit 9 to the system battery 20 and to the vehicle electrical system 4 connected in parallel thereto. The voltage regulating circuit 5 controls operation of the charging circuit 9 so as to control voltage fed to the system battery 20. Of course, the system battery 20 also connects to the marine or automotive on-board electronics system to be powered, such as lighting, radios, heaters, and other accessories (not shown).

Referring now to FIG. 6 in greater detail, the power coil 11 feeds a shunt voltage regulator 14 which controls voltage output to both the ignition timing circuit power supply 15 and the charging circuit power supply 16.

The ignition timing circuit power supply 15 contains a full wave bridge rectifier 21 which outputs to DC and RF filter capacitors 22. The filter capacitors output power supply voltage to the bipolar Hall effect transducer 24 in an ignition timing circuit 17. Additionally a protection network 25 prevents damage to the bipolar Hall effect transducer 24 during system operation.

On the flywheel hub 26 a bipolar ceramic magnet 28 is mounted by a magnetic insulator magnet mount 27. Flux concentrator rings 29 concentrate the magnetic flux so as to precisely effect turn on and turn off of the bipolar Hall effect transducer in conjunction with the Hall effect flux concentrator 23 as described hereafter in reference to FIGS. 7 and 8.

Figure 8:
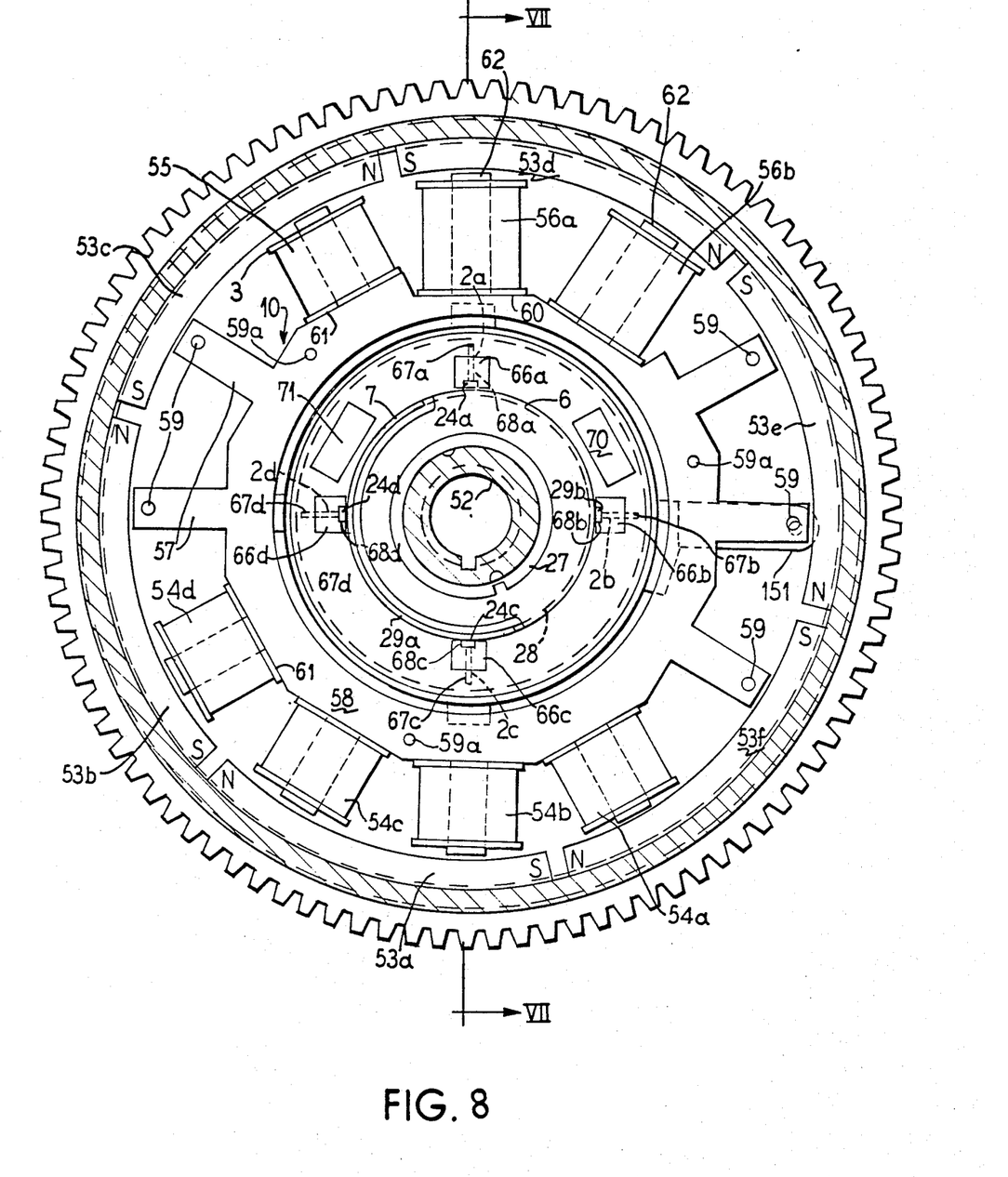
FIG. 8 is a top sectional view of the flywheel assembly, stator assembly, and ignition timing housing containing the Hall effect device in the ignition and charging system of the invention.
Figure 8A:
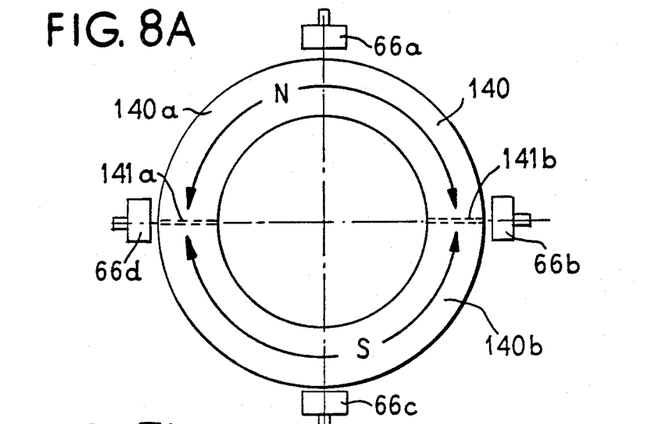
FIG. 8A is an alternate embodiment of a trigger magnet assembly employed in FIG. 8.

In an alternate embodiment of a portion of the system shown in FIG. 8, the bipolar magnet 28, magnetic insulator magnet mount 27, and flux concentrator rings 29 are eliminated and replaced with a plastic bonded ferrite molded magnet 140 shown in FIG. 8A. Such a magnet has a hemispherical north pole portion 140a and a hemispherical south pole portion 140b which converge with one another at first and second neutral sections 141a and 141b. The neutral sections must be as small as possible so that a sharp transition occurs between the north and south poles as the magnet rotates. It is preferred that the neutral sections have a width no greater than 0.045, and preferably having a maximum width of 0.03 inches with a design center of preferably 0.025 inches.

A switching signal from the bipolar Hall effect transducer 24 is fed to a capacitor discharge pulse network 30 so as to control the discharge SCR 35. Power is fed to the discharge SCR from the charge coil 12, through the circuit enable 31, shunt voltage regulator 32, blocking diode 33, and energy storage capacitor 34. The discharge SCR 35 then provides voltage to the ignition coil 36 in accordance with the desired timing of the ignition system so as to create a high voltage output to a series inductance 37 which in turn delivers a high voltage to a spark plug 19 for engine ignition. A clamping diode 38 also controls operation of the ignition coil 36.

The alternator coils 13 supply a charging voltage to the system battery 20 through full wave SCR rectifier 40. Additionally, the alternator coils supply voltage to the overvoltage lockout circuit 43. Circuit 43 outputs to circuit enable 41 which controls the voltage sense circuit 42 which also receives system battery voltage from battery 20. The overvoltage lockout circuit 43 is controlled by a separate overvoltage sense circuit 43a.

An output of the voltage sense circuit 42 connects to a gate control circuit 44 which in turn controls the full wave SCR rectifier 40. A zero cross enable circuit 45 also controls SCR rectifier 40. A full wave bridge rectifier 39 provides operating voltage to the gate control circuit 44.

Figure 7:
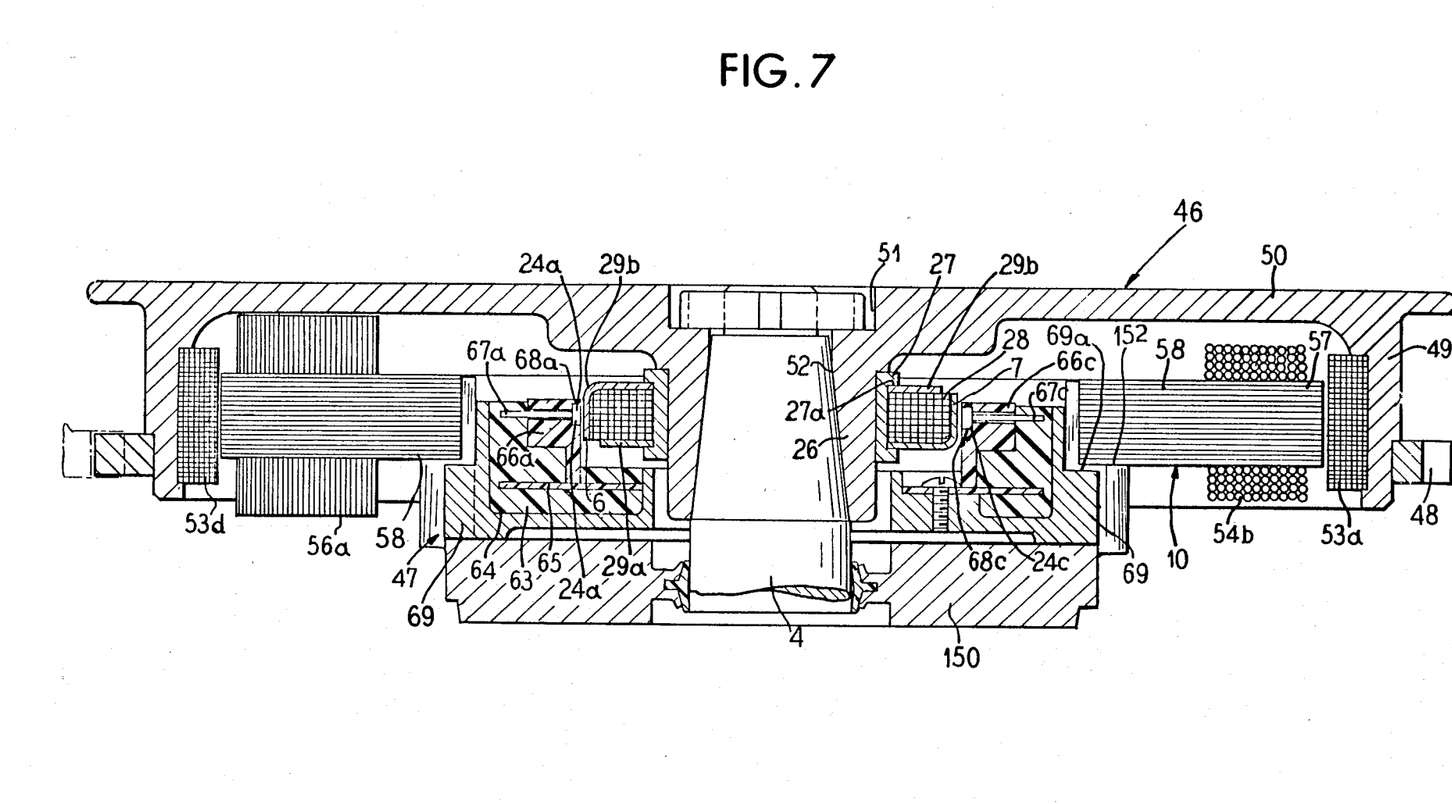
FIG. 7 is a cross-sectional view of the flywheel, stator assembly, and Hall effect device portions of the system shown in FIG. 6, and represents a cross-sectional view taken along the lines II—II of FIG. 8.

Referring now to FIGS. 7 and 8, the mechanical relationship of the flywheel or rotor 46, stator assembly 10, and ignition timing housing 47 containing the Hall effect transducers 24a, b, c, d will now be described in greater detail. FIG. 7 is a cross-sectional view taken along line VII—VII of FIG. 8 illustrating the top view.

As shown most clearly in FIG. 7, the flywheel or rotor 46 rotates in accordance with the drive shaft 4 of the engine not shown here. Such a drive shaft would mount in aperture 52 and be secured at mounting aperture 51. A starting ring gear 48 is attached at a peripheral portion of outer circular wall 49 of the flywheel or rotor 46. Ring gear 48 may be employed for starting of the engine through engagement with a starter motor. Alternatively, in a marine engine the flywheel or rotor 46 may be rotated during starting by a manual pull cord, not shown.

Flywheel 46 includes an upper wall 50 and a flywheel central hub portion 26 at which the mounting apertures 51 and 52 are provided at the inside of the hub 26.

A plurality of north-south ceramic magnets 53a, b, c, d e, f are provided on an inner surface of the circular wall 49 in a circular pattern as shown most clearly in the top view of FIG. 8. Adjacent end faces of the magnets alternate in polarity around the circle on which the magnets lie.

The stator assembly 10 is formed of a plurality of stacked laminations 58 shaped as shown in FIG. 8. Individual pole legs 57 and 62 are provided. The pole legs 57 are shorter and receive the power coil 55 or alternator coils 54a, b, c, d. Relatively longer pole legs 62 are provided for receiving charge coils 56a, b. The relatively longer pole legs 62 extend from a smaller radius surface 60 and the relatively shorter pole legs 57 extend from a larger radius surface 61 of the laminations.

Shorter legs can also be used for the charge coils, but increased copper mass on longer legs keeps the charge coils running cooler.

The laminations are held together by interior rivets 59a and also rivets 59 passing through ends of the unused pole legs to prevent vibration caused by the magnetic field. By use of the rivets 59, it is not necessary to impregnate the laminations.

The ignition timing housing 47 rests on a bearing cage 150 containing bearings for the motor crank shaft 4. The bearing cage 150 is an integral part of the engine. The laminations are supported on a cut-out step or shoulder 152. Four of such shoulders 152 may be provided.

The housing 47 may be rotatably positioned relative to the bearing cage 150 through fixing arm 151 (shown in FIG. 8) which extends from the housing 47. This fixing arm 151 may be secured in place after a desired timing has been achieved. By rotating the housing 47, the Hall effect devices are positioned relative to the magnetic timing means to achieve a desired timing relationship.

The housing 47 also has bosses or stop portions 69 having an upper surface 69a which serves to limit movement of the housing 47 in an axial direction of shaft 4 through abutment with a lower edge of the laminations 58.

The housing 47 retains the trigger or timing circuit PC board 65 impregnated in a pocket 64 therein.

Figure 7A:
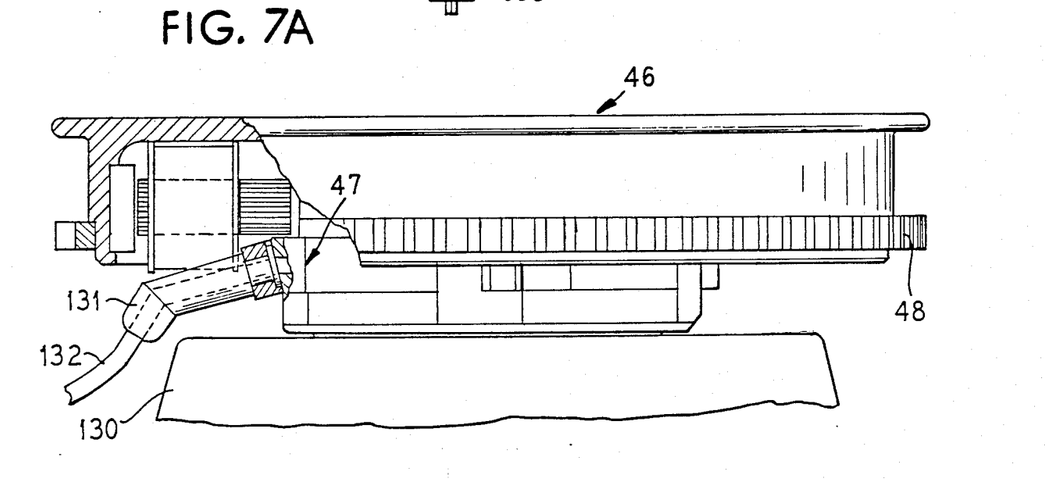
FIG. 7A is a side view of a trigger assembly with Hall effect devices in relation to the flywheel and engine block wherein a grommet unit conveys leads from the Hall effect device trigger assembly away from obstructions on the engine block.

As shown in FIG. 7A, lead wires 132 are guided from the housing 47. These wires connect to the PC board 65 having the Hall effect transducers associated therewith. In order to clear a top boss portion of the engine 130, an angled grommet 131 is provided. By use of this grommet, the wires readily clear obstructions on the engine.

Figure 7B:
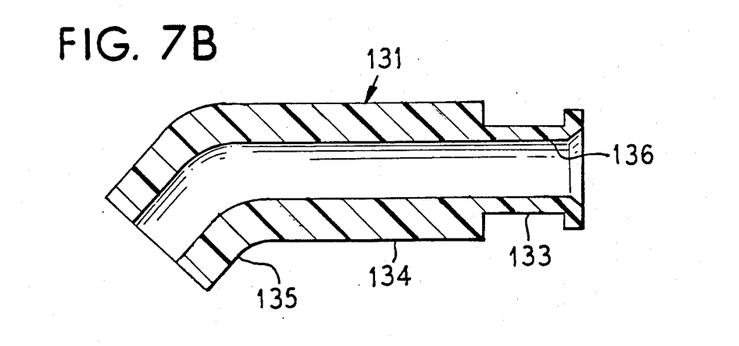
FIG. 7B is a cross-sectional view of the grommet shown in FIG. 7A.

FIG. 7B shows in cross-section the construction of the grommet 131. This grommet has an angled portion 135 which forms an angle of approximately 130° relative to a main body portion 134. A cut out ring-shaped portion 133 fits in an aperture of the housing 47 to retain the grommet there. A central passage 136 guides the wires through the grommet.

As shown in FIG. 8, the stator assembly 10 may, in one preferred embodiment, have a single power coil 55, two charge coils 56a and 56b, and four alternator coils 54a, b, c, and d. As can be seen in FIG. 8, additional pole legs are unused in this embodiment. However, if desired, to increase power capability, additional alternator coils, power coils, or charge As the flywheel rotates and the magnets 53a, b, c, d, e, f pass the end faces of the pole legs with the respective power, charge, and alternator coils thereon, voltages are generated in known fashion in the respective coils.

On the hub 26 of the flywheel or rotor 46, at an outer periphery thereof a magnet retainer 27 is provided as most clearly shown in FIG. 7. This magnet retainer supports a circular ceramic cylindrical magnet 28 together with an upper flux concentrator ring 29b and a lower flux concentrator ring 29a. The lower flux concentrator ring 29a has a partial side wall 7 which in the preferred embodiment shown here, extends approximately 180° as shown in FIG. 8. For the remaining 180°, it is not present. Rather, a corresponding side wall 6 extending down from the upper flux concentrator ring 29b is provided. These 180° side walls 6 or 7 thus alternately cover peripheral portions of the ring magnet 28 and respectively extend either from the top or the bottom of the ring magnet 28 at a periphery thereof. As discussed previously, the plastic bonded ferrite magnet of FIG. 8A may alternatively be employed.

The ignition timing housing 47 as shown in FIG. 7 contains the printed circuit board 65 for ignition timing circuitry and also contains a Hall device holder 66a, b, c, d at various locations around a circle as shown in FIG. 8. The Hall device holders 66a, b, c, d and circuit board 65 are impregnated in a potting compound 63 within the pocket 64 of the housing 47.

The bipolar Hall effect transducers 24a, b, c, d are mounted in the respective Hall device holders 66a, b, c, d and are positioned such that one surface of the transducer is directly adjacent to the flux concentrator ring side walls 6 or 7. A metal flux control rod 67a, b, c, d is positioned such that one end face is directly adjacent an opposite surface of the respective Hall effect transducers 24a, b, c, d and is also received within a respective aperture 2a, b, c, d of the Hall device holders 66a, b, c, d. These rods specifically locate the magnetic flux path onto the surface of the Hall effect transducers.

The Hall effect transducers 24a, b, c, d are received within respective pockets 68a, b, c, d of the Hall device holders 66a, b, c, d.

The metal rods 67a, b, c, d abut against the Hall device IC circuit outer wall so as to concentrate flux within a center of the integrated circuit of the Hall device.

As the flywheel or rotor 46 rotates, the transducers turn off and on in accordance with the flux concentrator ring outer walls 6 or 7 which are present. The flux concentrator ring 29b represents a north pole when the skirt 6 is present opposite the Hall effect transducer 24a as shown in FIG. 7. This turns off the Hall effect device. A south pole is represented by outer wall 7 as shown in the right-hand portion of FIG. 7. When this south pole is present, the Hall effect device 24c turns on.

By use of the sharp transitions between the ends of the skirts or side walls 7 or 6 (or sharp transition regions 141a, b in FIG. 8A) in combination with the sharp or narrow path flux concentration resulting by use of the metal rods 67a, b, c, d, a very sharp turn-on and turn-off characteristic occurs in the Hall effect transducer, independently of motor RPM. Thus, even at very slow motor RPM, the turn-on and turn-off of the Hall effect transducers is sharp, and a sharp or well-defined waveform with steep leading and trailing edges results at the output of the Hall effect transducers. The output waveform is substantially uninfluenced by the RPM.

As shown in FIG. 8, electrolytic capacitor 70 may be mounted between Hall effect transducer 24a and 24b and a further electrolytic capacitor 71 may be mounted between Hall effect transducer 24a and 24d on the ignition timing housing 47. In the preferred embodiment of the invention, the metal flux concentrating rods 67a, b, c, d preferably have a diameter of approximately 0.06 inches.

The structure of the circuit block shown in FIG. 6 will now be described in greater detail by reference to FIGS. 9A, 9B, and 10.

Figure 9A:
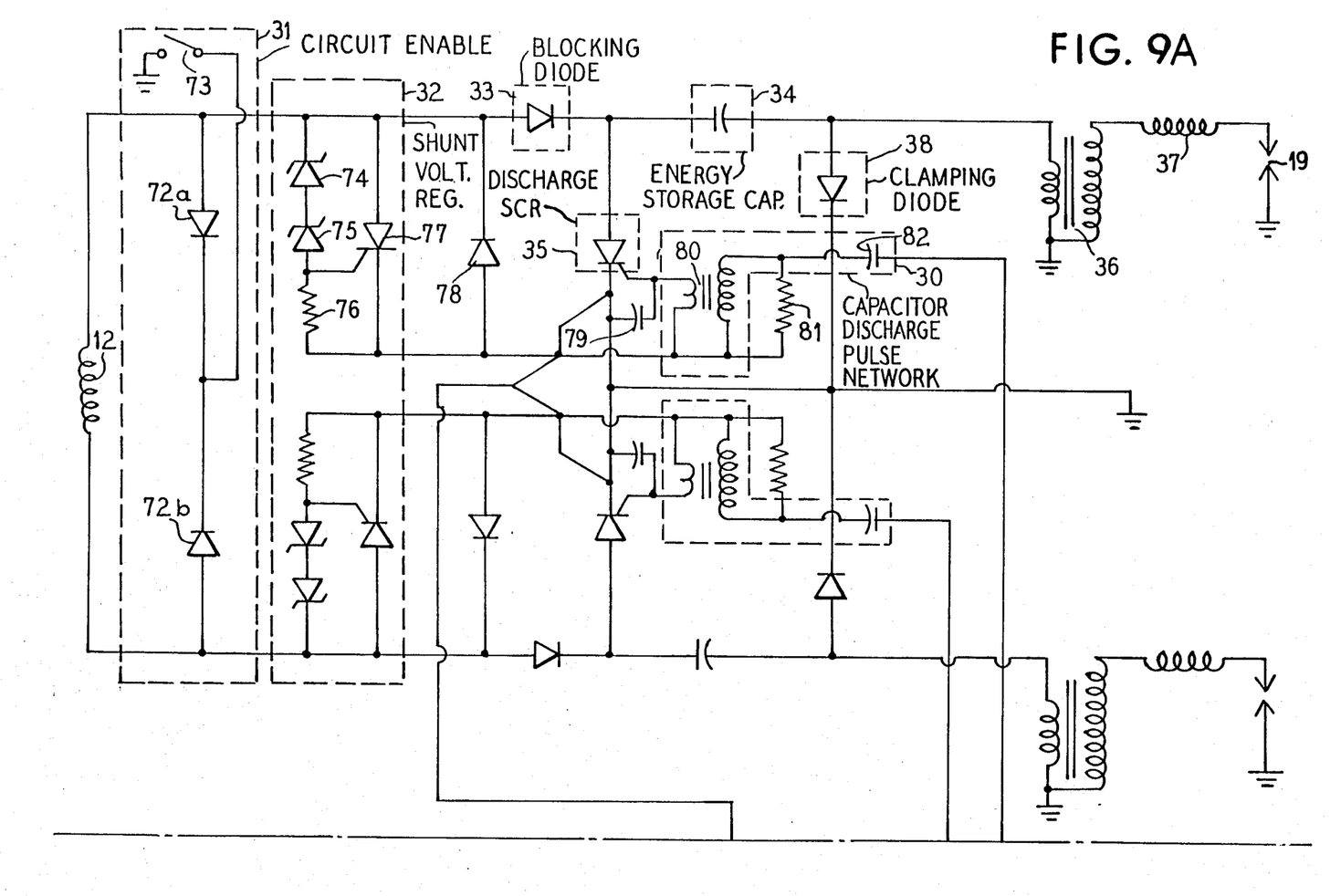
FIGS. 9A and 9B are, taken together, a detailed schematic diagram showing circuits fed by the charge coil and power coil, including the ignition timing circuit shown in the block diagram of FIG. 6.

As shown in FIG. 9A, at the output of charge coil 12 a circuit enable 31 is provided with a kill switch 73 for temporarily grounding outputs of the charge coil through diodes 72a, 72b. This results in no voltage to the ignition coil and thus no spark at the spark plugs 19, thus shutting off the engine.

The shunt voltage regulator 32 includes two identical sections formed of an SCR 77, series connected Zener diodes 74 and 75 connecting to the gate of the SCR 77, and bias resistor 76. A diode 78 is connected in parallel with the SCR 77. A blocking diode 33 connects voltage from the charge coil 12 through an energy storage capacitor 34 to the ignition coil 36. The capacitor discharge pulse network 30 controls a discharge SCR 35 connected between ground and one side of the energy storage capacitor 34. The gate of SCR 35 is controlled by the capacitor discharge pulse network 30 by current present at the secondary of transformer 80, which serves as a current amplifier. Capacitor 79 is provided in parallel with the gate of the SCR 35 and its cathode.

The primary of the current amplifying transformer 80 has a resistor 81 connected in parallel therewith, and a capacitor 82 is connected in series. The resistor 81, capacitor 82, and Hall device output form a control pulse for the primary of the transformer.

As shown in FIG. 9A, the other side of the charge coil also has a similar discharge SCR and capacitor discharge pulse network, and energy storage capacitor with associated blocking diode in mirror image fashion. The mirror image side of the circuit also supplies an ignition coil 36.

With the invention, the capacitor discharge pulse network 30 in FIG. 9A is controlled by the Hall effect device 24. When the Hall effect device 24 turns on, it discharges capacitor 82 into pulse transformer 80, so as to provide a turn-on pulse for discharge SCR 35. Upon complete discharge of energy storage capacitor 34, the SCR 35 again turns off. Without the capacitive discharge pulse network, the discharge SCR 35 will be on for a full 180°, corresponding to a full south pole of the trigger magnet. Thus, with the invention, less power is required to be output by the charge coil.

Figure 9B:
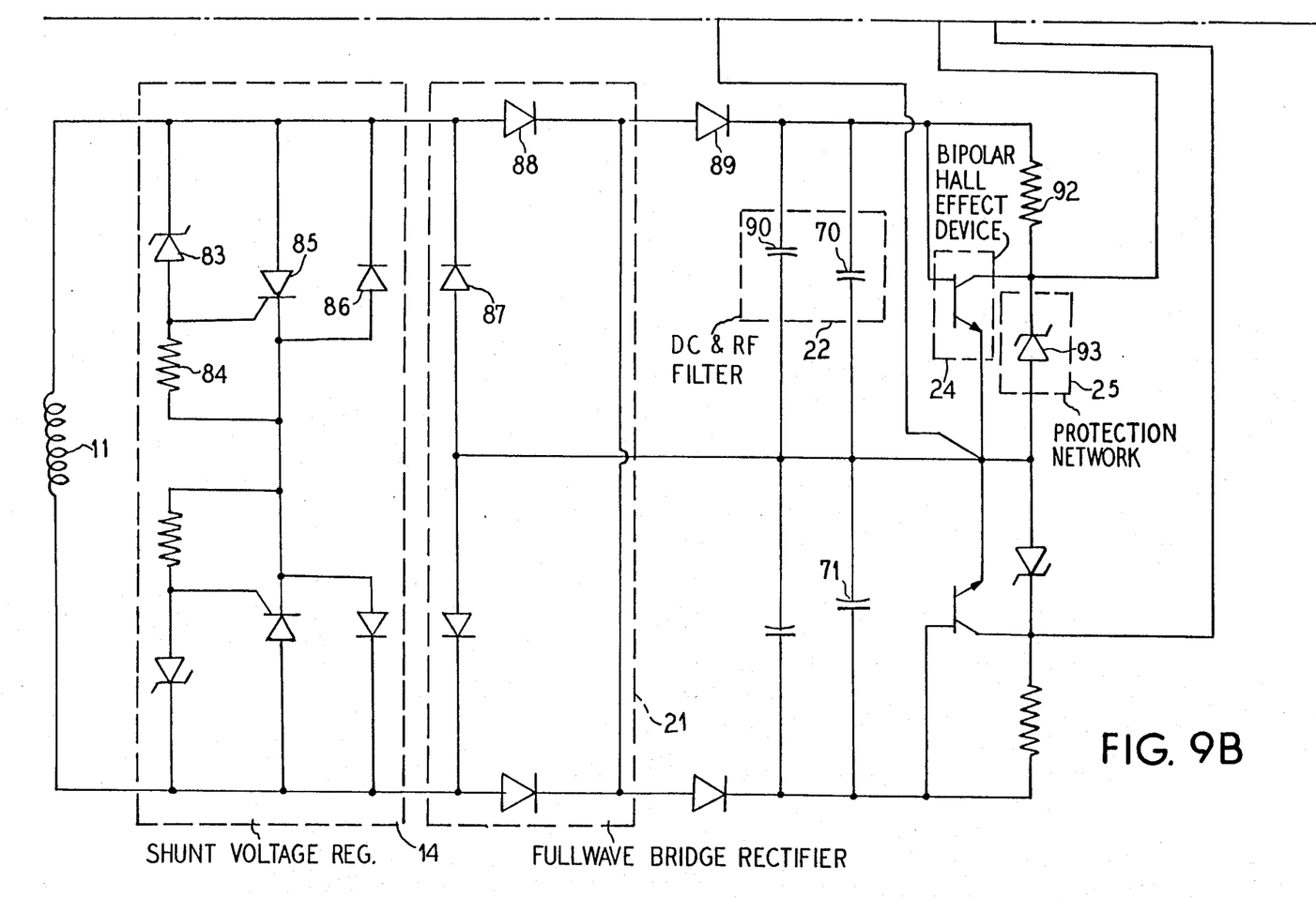

In FIG. 9B the power coil 11 is shown connecting with the shunt voltage regulator 14. The shunt voltage regulator 14 is formed of a mirror image circuit with one side being formed of a Zener 83, and resistor 84 controlling a gate of an SCR 85. A diode 86 connects across the SCR 85.

The output of the shunt voltage regulator 14 connects to a full wave bridge rectifier 21 formed of diodes 87 and 88 and the mirror image thereof. A steering diode 89 connects output voltage to the DC and RF filter 22 formed of a high frequency RF capacitor 90 and a low frequency electrolytic capacitor 70. Filtered power supply voltage is then fed to the bipolar Hall effect transducer 24. This transducer is an integrated circuit assembly provided by Microswitch, Inc., Honeywell Division, Freeport, Ill. as No. SS46. It includes a Hall effect device, trigger circuit, amplifier, voltage regulator, and Schmitt trigger. As previously explained, this Hall effect transducer is switched on and off by the aforementioned magnetic flux paths which are switched from north to south.

A resistor 92 bridges an output and input of the Hall effect transducer 24. The protection network 25 includes a Zener diode 93 connected across the output of the Hall effect transducer 24.

A mirror image of the circuit described above connects to the other side of the power coil.

The output of the Hall effect transducer 24 provides a switching voltage to the aforementioned capacitor pulse discharge network 30.

With the inventive circuit provided, the bipolar Hall effect device is off when a north pole is present at the device and is on with a south pole present. This results in a very efficient switching of the discharge SCR 35, independently of engine RPM.

With the invention, if the flywheel runs backwards, the engine won't start, unlike some prior art engines. This favorable result occurs since the bipolar Hall effect device will trigger the discharge SCRs 180° after top dead center when the pistons are at full downstroke.

Figure 10:
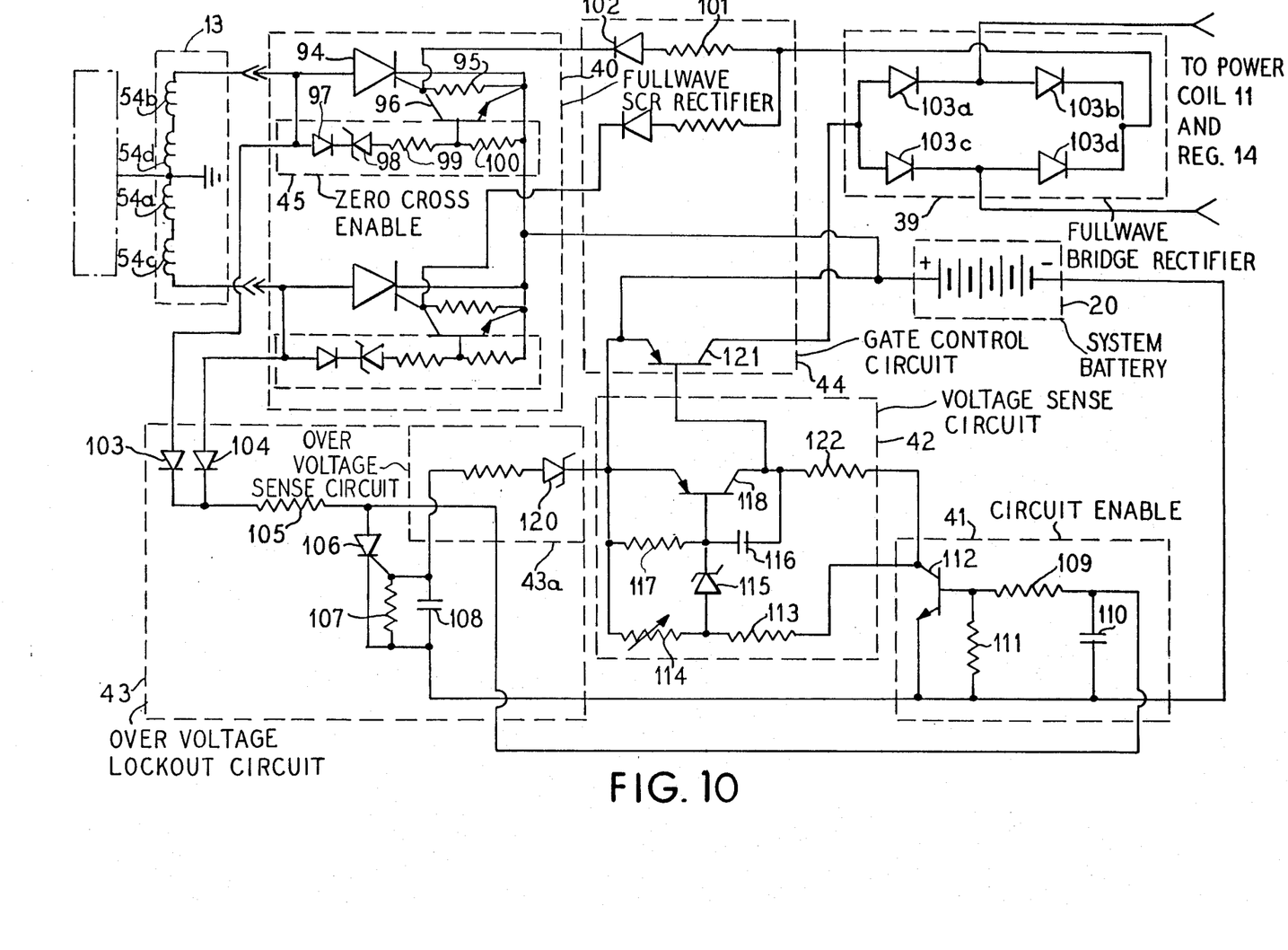
FIG. 10 is a detailed schematic diagram showing the circuits fed from the alternator coils and including the charging circuit and voltage regulating circuit shown in the block diagram of FIG. 6.

Referring now to FIG. 10, alternator coils 13 comprise individual stator coils 54b and 54d connected in series at one side, and alternator stator coils 54a and 54c connected in series at the other side. The series connected stator coils are connected at their output to respective full wave centertap SCR rectifier circuits 40. These circuits 40 comprise an SCR 94 whose gate is controlled by a transistor 96 having a resistor 95 in parallel with collector and emitter. A zero cross enable circuit 45 controls transistor 96. This zero cross enable circuit 45 includes a diode 97 connected in series with a Zener 98, resistor 99, and resistor 100.

The full wave centertap SCR rectifier circuit 40 is also controlled by a gate control circuit 44 formed of a resistor 101 and diode 102 receiving voltage from the full wave bridge rectifier 39 formed of diodes 103a, 103b, 103c, and 103d connected to the power coil 11 and shunt voltage regulator 14.

The alternator coils 13 also feed an over-voltage lockout circuit 43 which includes diodes 103 and 104 connecting to resistor 105, which in turn connects to SCR 106. The gate of SCR 106 is controlled by resistor 107 and capacitor 108, and by an output from the over-voltage sense circuit 43a. An output of the over-voltage lockout circuit 43 connects to a circuit enable 41 at capacitor 110, resistor 109, and resistor 111. Transistor 112 of the circuit enable 41 has its output connected to control the voltage sense circuit 42. Voltage sense circuit 42 includes a transistor 118 whose gate is connected to a resistor 117 and capacitor 116, and also to a Zener diode 115. The Zener diode 115 at its anode has a voltage divider formed of variable resistor 114, and resistor 113. A load resistor 122 connects to transistor 121.

The gate control circuit 44 includes a transistor 121 whose input connects to an output of the voltage sense circuit 42 and whose output at the emitter senses the voltage at the positive terminal of the 12-volt battery 20. The full wave bridge rectifier 39 supplies power to the collector of transistor 121 in the gate control circuit 44.

With the present invention, the zero cross enable circuit 45 turns on the full wave centertap SCR rectifier circuit 40 substantially only at the zero cross point of the SCR so as to prevent radio frequency interference.

Figure 11:
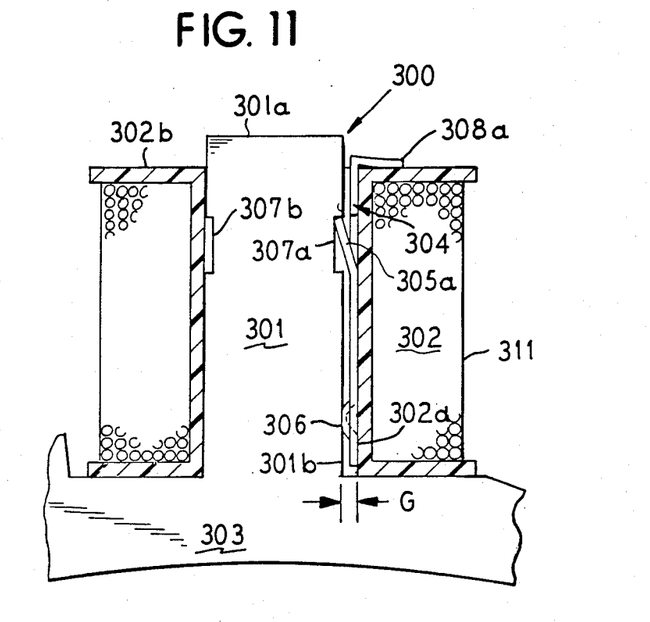
FIG. 11 is a cross-sectional view of a pole leg with an improved bobbin lock system.
Figure 12:
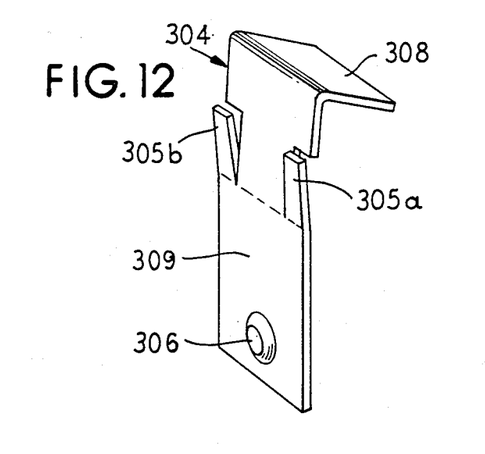
FIG. 12 is a perspective view of a bobbin locking clip employed in the system of FIG. 11.

If the engine is off, then the circuit enable 41 prevents battery current from being drained. The over-voltage lockout circuit 43 shuts down the charging circuit if there is a voltage sensing problem, or if the battery is accidentally disconnected from the circuit, such as the battery being thrown from the boat accidentally during maneuvering, or if the boat is hit by a wave or makes a sharp turn A coil and bobbin locking system is shown in FIGS. 11 and 12. In FIG. 11 at 300, a pole leg 301 is shown extending from a central portion 303 of the stator. The pole leg has at least one and possibly two notches 307a, b in side faces thereof near an end face 301a. The bobbin 302 has a coil 311 wound thereon. A gap G is provided between a central aperture 302a and the side 301b of the pole leg. In this gap G a bobbin lock clip 304 is inserted.

Referring to FIG. 12, the bobbin lock clip 304 has a springy lip 308 bent at less than 90° relative to a main section 309 of the clip. Kick-out tabs 305a, b are provided in a portion 311 which is bent through bending zone 310 relative to portion 309. A raised embossment 306 is also provided.

With the system shown, the bobbin and coil can be manufactured separately from the stator assembly. Thereafter, the bobbin and associated coil, which may be impregnated, is then slipped over the pole leg. The clip 304 is then inserted in the gap G such that an end of the tabs 305a, b contacts an upper end of the notch 307a. A three-point contact is provided between the raised embossment 306 and kick-outs 305a, b.

When the clip is in the gap, the end of the tab 308 shown at 308a contacts the upper surface 302b of the bobbin so as to force the end of the kick-out tabs 305a, b and retain them in position in the notch.

With the above system, not only can the bobbins with the coils be manufactured separately from the lamination assembly, but also individual coils can be selectively removed in the field without the need for replacing an entire stator assembly.

With the aforementioned Hall effect device ignition and charging system, a separate power coil is provided which generates a control voltage for the voltage regulator and Hall effect transducers. A traditional pick-up coil is not employed to provide a triggering voltage.

The following advantages result. The Hall effect transducer either sees a north or south magnetic flux and switches on or off virtually instantaneously. The flux change which triggers the Hall effect device occurs quickly and precisely in view of the aforementioned magnetic flux concentration apparatus, including the flux concentrator ring side walls or skirts 6 and 7 and the flux concentrator rods 67a, b, c, d, or the plastic bonded ferrite magnet system with narrow transition region shown in FIG. 8A.

In view of the above, the Hall effect transducers produce a well-defined output waveform which has steep leading and trailing edges and which has a pulse totally independent of RPM. This is unlike the prior pickup coil which generated a broad wave shape, the profile of which changed with RPM. Thus, timing is very precise and is virtually independent of RPM.

This allows the engine, and particularly a marine engine, to start at low RPM. Even at such low RPM, with the present invention the rapid flux change permits a high amplitude, well-defined signal to be generated by the trigger or timing circuits. This contrasts with the prior art wherein at low RPM the pickup coils would generate very little voltage since slow flux changes would result. Additionally, the shape of the output waveform from the pickup coils would change with RPM and would be quite broad at lower RPMs. Furthermore, the improved alternator efficiency at low RPM with the improved flywheel described previously in FIGS. 2–4, results in an overall system of high efficiency, and ease of starting at low RPM.

Although various minor changes and modifications might be proposed by those skilled in the art, it will be understood that I wish to include within the claims of the patent warranted hereon all such changes and modifications as reasonably come within my contribution to the art.

I claim as my invention:

1. An alternator employed in an engine having a drive shaft, comprising:
   a flywheel connected to the drive shaft forming a rotor of the alternator, and said rotor having an interior cup-shaped portion receiving a plurality of ceramic magnets;
   a stator constructed of silicon steel laminations positioned within the cup-shaped portion of the rotor and having at least one alternator coil on a stator pole positioned relative to the magnets on the rotor such that the magnets are directly adjacent and move past a pole face of the pole as the rotor rotates;
   the rotor cup-shaped portion being circumferentially defined by an outer circular wall surrounding the stator and having said ceramic magnets mounted directly on an inside surface thereof facing the at least one stator pole face;
   a ring-shaped starter motor ring gear surrounding the rotor and mounted on an outside surface of said outer circular wall;
   the outer circular wall having a thickness at a location where the magnets are mounted of equal to or less than 0.3 inches;
   said thickness of the outer circular wall expressed as a percentage of radius of the rotor from a central axis thereof to said outer surface of the outer circular wall being equal to or less than 7%; and
   said rotor being of one-piece construction and comprising a ductile iron casting.

2. An alternator according to claim 1 wherein an outer diameter of the flywheel is at least 8 inches.

3. An alternator according to claim 1 wherein at least six north/south magnets each formed as a circular arc segment are provided in a circular arrangement on said inside surface of the outer circular wall of the rotor.

4. An engine alternator and charging system, comprising:
   a flywheel having means for connection thereof to a drive shaft on an engine;
   the flywheel also being a rotor of an alternator and having a cup-shaped portion defined by an outer circular wall having a plurality of magnets mounted on an inner surface thereof, said rotor having magnetic timing means thereon, and said rotor being a one-piece ductile iron casting;
   a thickness of the circular wall of the rotor being less than or equal to 7% of a radius from a central axis of the rotor to an outer surface thereof and said circular wall thickness at a location where the magnets are mounted being less than or equal to 0.3 inches;
   a stator received within the cup-shaped portion of the flywheel;
   a stator having at least one power coil, at least one alternator coil, and at least one charge coil;
   the charging and regulating means connected between a system battery and the alternator coil for regulating a voltage delivered to the battery and charging the battery;
   the charging and regulating means comprising at least one semiconductor switching device in series with at least one output of the alternator coil, and biasing means connected to the power coil for supplying bias voltage to the semiconductor device;
   Hall effect device timing means mounted in fixed relation relative to the rotor and being connected to said power coil for generating a timing signal based on sensing the passage of said magnetic timing means on the rotor; and
   ignition means for igniting fuel for the engine connected to receive power from said charge coil and controlled by said timing means.

5. The system of claim 4 wherein the stator is a silicon steel stator and the magnets are ceramic magnets.

* * * * *